(12) United States Patent
Strauss et al.

(10) Patent No.: US 12,447,974 B2
(45) Date of Patent: Oct. 21, 2025

(54) METHOD AND SYSTEM FOR DETECTING A SEAT OCCUPANCY STATE OF A SEATING ARRANGEMENT BASED ON RADAR POINT CLOUDS

(71) Applicant: Gestigon GmbH, Luebeck (DE)

(72) Inventors: Christian Strauss, Luebeck (DE); Verena Krueckemeier, Luebeck (DE)

(73) Assignee: Gestigon GmbH, Luebeck (DE)

( * ) Notice: Subject to any disclaimer, the term of this patent is extended or adjusted under 35 U.S.C. 154(b) by 336 days.

(21) Appl. No.: 18/330,633

(22) Filed: Jun. 7, 2023

(65) Prior Publication Data
US 2023/0398993 A1 Dec. 14, 2023

(30) Foreign Application Priority Data
Jun. 8, 2022 (EP) .................................. 22177808

(51) Int. Cl.
*B60W 40/08* (2012.01)
*B60N 2/00* (2006.01)
(Continued)

(52) U.S. Cl.
CPC ............. *B60W 40/08* (2013.01); *B60N 2/002* (2013.01); *G01S 13/04* (2013.01); *G01S 13/89* (2013.01);
(Continued)

(58) Field of Classification Search
CPC ........... B60W 40/08; B60W 2540/227; B60W 2420/408; B60W 2040/0881; B60N 2/002; G01S 13/04; G01S 13/89
(Continued)

(56) References Cited

U.S. PATENT DOCUMENTS

2012/0143786 A1 6/2012 Karner
2017/0039835 A1\* 2/2017 Brankovic ........... H01Q 19/108
(Continued)

FOREIGN PATENT DOCUMENTS

CN 111703393 A \* 9/2020 ............. B60R 21/01
EP 3460507 A1 3/2019

OTHER PUBLICATIONS

European Search Report issued in European Application No. 22177808.7 mailed on Dec. 2, 2022 (5 pages).

Primary Examiner — William Kelleher
Assistant Examiner — Samarina Makhdoom
(74) *Attorney, Agent, or Firm* — Osha Bergman Watanabe & Burton LLP (57) ABSTRACT

A method for the automated detection of a seat occupancy state of a seating arrangement involves receiving or generating measurement data representing an associated radar point cloud for each measurement frame from a plurality of measurement frames; and determining a seat occupancy state of the seating arrangement based on an evaluation model, which returns, as a function of at least two groups of radar point clouds, one of a plurality of predefined possible seat occupancy states of the seating arrangement as an evaluation result. For each radar point cloud, the set of its radar points is segmented into clusters in order to individually assign to each of the seats one of the clusters located spatially closest to it. A stored seat occupancy state is updated based on the evaluation result only if the value is less than a threshold value.

15 Claims, 6 Drawing Sheets

(51) Int. Cl.
*G01S 13/04* (2006.01)
*G01S 13/89* (2006.01)

(52) U.S. Cl.
CPC .............. *B60W 2040/0881* (2013.01); *B60W 2420/408* (2024.01); *B60W 2540/227* (2020.02)

(58) Field of Classification Search
USPC .......................................................... 342/27
See application file for complete search history.

(56) References Cited

U.S. PATENT DOCUMENTS

| | | | |
|---|---|---|---|
| 2018/0222360 A1* | 8/2018 | Fournier | B60N 2/42745 |
| 2019/0094350 A1* | 3/2019 | Baheti | G01S 7/415 |
| 2019/0100115 A1* | 4/2019 | Larkins | B60R 21/01542 |

* cited by examiner

| Seat occupancy state | Number of radar points contained in the cluster assigned to seat 105c for the measurement frame with the smallest temporal length | Number of radar points contained in the cluster assigned to seat 105d for the measurement frame with the smallest temporal length | Number of radar points contained in the cluster assigned to seat 105e for the measurement frame with the smallest temporal length | Seat 105c Doppler-shift value | Seat 105d Doppler-shift value | Seat 105e Doppler-shift value |
|---|---|---|---|---|---|---|
| 1 - Stationary objects | 20 | 14 | 0 | 0.003519 | 0.002777 | 0.008529 |
| 2 - Stationary objects | 23 | 14 | 0 | 0.003063 | 0.00317 | 0.007971 |
| 3 - Stationary objects | 20 | 15 | 0 | 0.002893 | 0.00395 | 0.007872 |
| 4 - One moving object | 194 | 41 | 7 | 0.188169 | 0.108897 | 0.018803 |
| 5 - One moving object | 196 | 43 | 5 | 0.192696 | 0.112815 | 0.017051 |
| 6 - One moving object | 190 | 39 | 5 | 0.181183 | 0.118013 | 0.016122 |

METHOD AND SYSTEM FOR DETECTING A SEAT OCCUPANCY STATE OF A SEATING ARRANGEMENT BASED ON RADAR POINT CLOUDS

The present invention relates to a method, a computer program and a system configured for carrying out the method, in each case for automatically detecting a seat occupancy state of a seating arrangement having a plurality of seats.

In various situations, it may be necessary to automatically determine the current seat occupancy state of a seating arrangement having a plurality of seats. Such a situation may occur in particular in vehicles, for example in motor vehicles, where a configuration of the vehicle or an activation, deactivation and/or control of one or more vehicle functionalities is to be carried out depending on a current seat occupancy state. For example, in motor vehicles, it is known to output an acoustic or visual warning to vehicle occupants to apply seatbelts or to control the activation or deactivation of airbags depending on a detected seat occupancy state.

For the automated detection of a current seat occupancy state of a seating arrangement with one or more seats, in particular an arrangement of vehicle seats in a vehicle, so-called seat occupancy mats are known for this purpose, which are integrated into the seats (usually one per seat) and use pressure-sensitive sensors for detecting whether the respective seat is occupied. A seat occupancy state of the seat is determined depending on the sensor signals or sensor data of these sensors, usually by means of a threshold comparison.

These known solutions therefore require the seats to be equipped with built-in sensors and are usually also unable to distinguish between different seat occupancy states other than "occupied" and "unoccupied". In addition, the sensors typically have to be integrated into the seats at the factory, making retrofitting difficult or impossible and eliminating the ability to detect a seat occupancy state of seats not equipped in this way.

Furthermore, for the automated detection of a current seat occupancy state, systems with a radar sensor for radar scanning of the seating arrangement are known, which determine whether a seat is occupied or not based on a plurality of radar point clouds each representing measurement data acquired in different measurement frames with different durations. However, if a person in a seat is moving to a large extent, the radar point cloud will move towards that person, which may mask or prevent detection of people on other seats who may be moving by a lesser amount.

It is an object of the present invention to provide an improved solution for the automated detection of a seat occupancy state of a seating arrangement having at least one seat.

The object is achieved according to the teaching of the independent claims. Various embodiments and developments of the invention are the subject matter of the dependent claims.

A first aspect of the solution presented here relates to an in particular computer-implemented method for the automated detection of a seat occupancy state, in particular based on individual seating positions, of a seating arrangement having a plurality of seating positions (or equivalent: seats), in particular seats in or for a vehicle, such as an automobile (e.g. lorry, car or bus), for which a seat occupancy state is to be determined individually or cumulatively as part of the method. The method comprises: receiving or generating measurement data, in each case representing an associated radar point cloud for each measurement frame from a plurality of measurement frames, so that the measurement data represents a multiplicity of radar point clouds corresponding to the plurality of measurement frames, wherein each radar point cloud of the multiplicity of radar point clouds was or is obtained on the basis of a radar scan of a spatial region surrounding at least some sections of the seating arrangement, which takes place at a measurement time or during a measurement period assigned to the respective measurement frame, and contains radar points, the plurality of measurement frames comprise a plurality of groups of measurement frames which each comprise one or more measurement frames of the same temporal length, the temporal length of measurement frames of different groups of measurement frames is different, and one corresponding group of radar point clouds is assigned to each of the plurality of groups of measurement frames; and determining a seat occupancy state of the seating arrangement based on an evaluation model, which returns, as a function of at least two groups of radar point clouds, one of a plurality of predefined possible seat occupancy states of the seating arrangement as an evaluation result; wherein the individual radar points of each radar point cloud are each represented at least by one position of the respective radar point in three-dimensional space; for each radar point cloud, the set of its radar points is sub-divided, by means of clustering as a function of the respective spatial position of the radar points in relation to the seats, into a plurality of clusters each containing a subset of the radar points, in order to individually assign to each of the seats one of the clusters located spatially closest to it; the determination of the seat occupancy state of the seating arrangement comprises an individual determination of a respective individual seat occupancy state for each of the seats as a function of the respective associated clusters of the at least two groups of radar point clouds in order to obtain an evaluation result identifying a seat occupancy state of the respective seat; for each cluster of at least one radar point cloud of that group of the at least two groups of radar point clouds that is assigned to the measurement frame with the smallest temporal length, a number of the radar points contained in the respective cluster or a quantity dependent on that number is determined, it is determined whether the number of radar points contained in the respective cluster of a single radar point cloud of the particular group of the at least two groups of radar point clouds that is assigned to the measurement frame with the smallest temporal length, or a quantity dependent on that number, or a mean value of the respective numbers of the radar points contained in respective clusters of multiple radar point clouds, spatially corresponding to each other, of the particular group of the at least two groups of radar point clouds that is assigned to the measurement frame with the smallest temporal length, or a quantity dependent on that value, is less than a first predefined threshold value or not, and a stored seat occupancy state is updated based on the evaluation result only if, for each cluster of the individual radar point cloud of the particular group of the at least two groups of radar point clouds that is assigned to the measurement frame with the smallest temporal length, the number of radar points or the quantity dependent on that number is less than the first predefined threshold value, or if all the mean values of the respective numbers of the radar points in respective clusters of multiple radar point clouds, spatially corresponding to each other, of the particular group of the at least two groups of radar point clouds that is assigned to the measurement frame with the smallest temporal length, or the quantity dependent on them, is less than the first predefined threshold, and outputting information defined according to the evaluation result if the stored seat occupancy state has been updated.

The term "seat occupancy state" of a seating arrangement with a plurality of seats, as used herein, is to be understood in particular to mean information indicating whether or to what extent the seating arrangement or at least one of its seats is occupied or taken up by an object, in particular a person or thing. The seat occupancy state in a simple example may only indicate the presence or absence of an object, or in a further developed example, in the case of the presence of at least one object on the seating arrangement or one or more of its seats, make a statement about the nature or another characteristic of the object, for example, its spatial extent.

The term "radar point cloud", as used herein, is to be understood in particular to mean a set of points of a vector space obtained by means of radar scanning of at least one object surface, which has a typically unorganized spatial structure ("cloud"). In the case of a radar point cloud, the points of the radar point cloud can be called "radar points". A (radar) point cloud can be described in particular by the (radar) points contained in it.

The radar points, in turn, can each be described in particular by their spatial coordinates, each of these radar points specifying a location of reflection of a radiated radar signal at an object surface measured in the radar scanning. In addition to the radar points, attributes such as measured Doppler velocity or a signal-to-noise ratio (SNR) can be acquired.

The term "measurement frame", as used herein, is understood in particular to mean a measurement time or a measurement period in a chronological sequence of defined, in particular periodically, consecutive measurement points or measurement periods, at or during which each measurement, in the present case a radar scan of at least one object surface, takes place or has taken place. Each measurement frame is assigned the result of the measurement associated with it, in this case the radar point cloud generated for the measurement frame by radar scanning.

The term "evaluation model", as used herein, is understood to mean an in particular mathematical model which a radar point cloud, or one or more parameters characteristic of it, uses as input variable(s) to return an evaluation result dependent on it, in the present case one of multiple predefined possible seat occupancy states of the seating arrangement. In particular, the evaluation model may be a mathematical estimation function, wherein the radar point cloud represents empirical data as a random sample and the evaluation result represents an estimation determined as a function of it. The evaluation model may in particular be a "machine learning model", which is understood here in particular to mean a mathematical, in particular statistical, model for making predictions or decisions by means of at least one machine learning algorithm on the basis of example data, known as training data, without the algorithm (s) being explicitly programmed to make such predictions or decisions. In particular, decision tree-based models for machine learning are machine learning models.

In particular, the information to be output can represent the evaluation result itself. It may also be a signal, in particular detectable with a human sense, such as a warning, or a control signal for activating a signal source, or a data signal carrying the information.

The terms "comprises," "contains," "includes," "has,", "having" or any other variant thereof as may be used herein are intended to cover non-exclusive inclusion. By way of example, a method or a device that comprises or has a list of elements is thus not necessarily limited to those elements, but may include other elements that are not expressly listed or that are inherent in such a method or such a device.

Furthermore, unless expressly stated otherwise, "or" refers to an inclusive or and not to an exclusive "or". For example, a condition A or B is satisfied by one of the following conditions: A is true (or present) and B is false (or absent), A is false (or absent) and B is true (or present), and both A and B are true (or present).

The terms "a" or "an" as used herein are defined as "one or more". The terms "another" and "a further" and any other variant thereof should be understood in the sense of "at least one other".

The term "plurality" as used here should be understood in the sense of "two or more".

The terms "configured" or "designed" to fulfil a particular function (and any variations thereof) as may be used herein are understood to mean for the purposes of the invention that the corresponding device is already present in a configuration or setting in which it can perform the function or the device is at least adjustable—i.e. configurable—such that it can perform the function after appropriate adjustment. The configuration can be applied, for example, by an appropriate setting of parameters of a process sequence or of switches or similar for activating or deactivating functionalities or settings. In particular, the device may comprise multiple predetermined configurations or operating modes, so that the configuration can be carried out by means of a selection of one of these configurations or operating modes.

According to the invention, the radar point clouds are segmented into multiple clusters by assigning a subset of the radar points as a cluster to each of the seats depending on their respective position, in particular uniquely per radar point, such that the radar points of the cluster are located in a defined closed, in particular cuboid, spatial region in the vicinity of the seat. In particular, the assignment can be carried out in such a way that each radar point is assigned to the cluster of the seat located nearest to it. Thus, the radar point cloud can be divided into clusters, i.e. subsets of the radar point cloud localized in the vicinity of the respective seats, so that the seat-specific seat occupancy states can be determined in a targeted manner and therefore with high reliability on the basis of the cluster assigned to the respective seat.

The clusters thus each contain an, in particular true, subset of the set of radar points of the relevant radar point cloud. In some embodiments, the clustering can be carried out in particular such that the clusters are disjoint, so that no radar point is assigned to two different clusters.

Using the method according to the first aspect, an evaluation result characterizing (in particular in the sense of a prediction or classification) a seat occupancy state of the seating arrangement can be obtained on the basis of radar point clouds collected from an actual or simulated radar scan of a spatial region surrounding the seating arrangement. Thus, radar-based solutions can be implemented, in particular in the vehicle context (in particular for automobiles), which can reliably detect a seat occupancy state (in particular exclusively) by means of radar and, on this basis, can activate, deactivate or control certain functionalities or systems, such as a seatbelt warning system or an airbag system, either altogether or selectively.

The number of radar points generated per radar point cloud in many radar measurement techniques depends on whether or in what manner an object is moving. In experiments it has been found that if the object located on a seat is moving quickly, in particular the number of radar points acquired in a measurement frame with a short, in particular minimum temporal length, which are assigned to the corresponding cluster, increases sharply. Therefore, by selecting a suitable first predefined threshold, which can be determined based on empirical data, and comparing the number of acquired radar points or a quantity derived from it with the first predefined threshold, it is possible to ascertain or determine whether the evaluation result returned by the evaluation model is incorrect or not.

In particular, by determining, for each cluster of at least one radar point cloud of the group of the at least two groups of radar point clouds that is assigned to the measurement frame with the smallest temporal length, a number of the radar points contained in the respective cluster or a quantity dependent on it, it is possible determine whether or not the number of radar points contained in the respective cluster of a single radar point cloud of that group of the at least two groups of radar point clouds that is assigned to the measurement frame with the smallest temporal length, or a quantity dependent on it or whether or not a mean value of the respective numbers of radar points contained in each of the clusters, spatially corresponding to each other, of a plurality of radar point clouds of that group of the at least two groups of radar point clouds that is associated with the measurement frame with the smallest temporal length, or a quantity dependent on that value, is less than a first predefined threshold value, on the basis of the determination(s), i.e. in particular if for each cluster of the individual radar point cloud of the group of the at least two groups of radar point clouds that is assigned to the measurement frame with the smallest temporal length, the number of radar points or the quantity dependent on it is greater than the first predefined threshold value or if all the mean values of the respective numbers of the radar point clouds contained in respective clusters of multiple radar point clouds spatially corresponding to each other of that group of the at least two groups of radar point clouds that is assigned to the measurement frame with the smallest temporal length, or the quantity dependent on it, is greater than the first predefined threshold value, it can be detected with a high degree of certainty that the seat occupancy state of the seating arrangement determined on the basis of the evaluation is incorrect. If this is the case, the radar scan performed is discarded and the seat occupancy state determined and stored using a previous radar scan is not updated using the most recently performed radar scan. In this way, the error rate in the output of the seat occupancy state can be reduced.

Various exemplary embodiments of the method will now be described below, each of which, unless expressly excluded or technically impossible, may be combined as desired with one another and with the other aspects of the present solution also described.

In experiments, it has also been found that, if the object located on a seat is moving quickly, in particular a Doppler-shift value of the radar signal at the respective radar point for radar points contained in the cluster that is assigned to the corresponding seat, also greatly increases. Therefore, by selecting a suitable second predefined threshold value, which can be determined based on empirical data, and (additionally) comparing the Doppler-shift values of the radar points contained in the cluster with the second predefined threshold value, it is possible to ascertain or determine whether or not the evaluation result returned by the evaluation model is incorrect.

Accordingly, in some embodiments the individual radar points of each radar point cloud are further represented in each case by a Doppler-shift value of the radar signal at the respective radar point, wherein for each cluster of at least one radar point cloud of the at least two groups of radar point clouds it is determined whether or not the Doppler-shift value of each radar point of the respective cluster or a mean value of the Doppler-shift values of all radar points of the respective cluster is less than a second predefined threshold value, and the stored seat occupancy state is only updated based on the evaluation result if, for each cluster of a single radar point cloud of the at least two groups of radar point clouds, the Doppler-shift value of each radar point of the respective cluster or a mean value of the Doppler-shift values of all radar points of the respective cluster is less than the second predefined threshold value, or if a mean value of the respective mean values of the Doppler-shift values of all radar points contained in respective clusters of multiple radar point clouds, spatially corresponding to each other, of the at least two groups of radar point clouds is less than the predefined second threshold value.

In this way, the error rate in the output of the seat occupancy state can be further reduced.

In some embodiments, the at least two groups of measurement frames have a plurality of temporally consecutive measurement frames. This can improve the accuracy of the detection of the seat occupancy state and/or a movement of the object can be detected or classified.

In some embodiments, the method further comprises: for each of the respective (multiple) radar point clouds of the at least two groups of radar point clouds, which are taken into account when determining the seat occupancy state, determining the respective value of at least one defined characteristic value for characterizing radar point clouds, wherein the evaluation model is or will be defined such that, in determining the seat occupancy state of the seating arrangement, the evaluation result is determined as a function of the respective values of at least one characteristic value for the radar point clouds of the at least two groups of radar point clouds which are taken into account in determining the seat occupancy state. In this way, the evaluation model can be defined and applied in a simplified manner, since instead of entire radar point clouds, only the values of the at least one characteristic value need be taken into account as input variables. In this case, a time curve of the values can reflect a movement or a specific movement pattern of one or more objects on the seating arrangement, so that the evaluation model can determine the seating occupancy state of the seating arrangement in a particularly reliable manner on this basis.

In some embodiments, for at least one of the characteristic values of a plurality of radar point clouds of each group of the at least two groups of radar point clouds, the respective values of the characteristic value are analysed in such a way that a periodic curve of the characteristic value is detected, wherein the evaluation result is determined as a function of the result of the analysis. In particular, not only can the presence of any object on a seat of the seating arrangement be detected, but even with high reliability a distinction can be made between living objects present on the seating arrangement, especially between persons and mammals such as pets (e.g. dogs). In particular, it is possible to display the information to be output in accordance with the method depending on the detection or non-detection of such a periodic curve. In particular, one or more detected frequencies of the periodic curve can be taken into account, in particular in such a way that the information is defined as a function of whether the or a frequency is within a certain frequency range such as a typical respiratory frequency range. In particular, a seatbelt fastening warning function or an airbag system can be controlled depending on whether a respiratory rate, and thus with a high probability a person, was detected on the seating arrangement or a specific seat of it.

In some embodiments, the or one of the characteristic values is or will be defined by the number of radar points in the respective radar point cloud or a quantity dependent on that number. If in the radar scanning in a measurement frame the number of radar points of the radar point cloud generated depends on the extent to which the scanned object is moving, the extent of the movement can thus be represented in the characteristic value(s), in particular with regard to the aforementioned detection of a respiratory frequency of the object.

In some embodiments, at least one measurement frame of one of the at least two groups of measurement frames and one measurement frame of another of the at least two groups of measurement frames overlap in time. In this way, one or more measurement frames of the one group of measurement frames with short temporal length can be used to detect rapid movements of the object, while simultaneously one or more measurement frames of the other group of measurement frames with long temporal length can be used to detect slow movements of the object. For example, if five groups of measurement frames are used, each having a temporal length of 128 ms, 256 ms, 512 ms, 1024 ms or 2048 ms, then all or at least almost all possible movements of the object can be detected by means of the evaluation model.

In some embodiments, the evaluation model comprises a trained machine learning model, wherein data which at least represents the two groups of radar point clouds or values of one or more characteristic values defined for them, is provided as input data to the machine learning model in order to obtain the evaluation result as its output. This allows a particularly flexible and adaptable implementation of the evaluation model, wherein machine learning can be used to continuously improve the evaluation model and thus the quality and reliability of the seat occupancy recognition. In particular, the evaluation result can indicate a class of a seat occupancy state classification. In particular, the machine learning model may be a decision tree-based model or a model based on an artificial neural network. In this case, the characteristic value can be determined, for example, by the number of radar points in the radar point clouds of at least two groups of radar point clouds or a quantity dependent on that number.

In some embodiments, the output of the information comprises activating a signal source as a function of the information to cause the signal source to output a defined signal depending on the activation. The signal source may in particular be an audio source, an optical signal source, in particular a display device for images or text, and/or a haptic actuator or a combination of at least two of the aforementioned signal sources. This means that by means of the signalling, the detected seat occupancy state can be communicated to a user or used to control another technical system, such as an airbag system.

In some embodiments the signal source is activated as a function of the information so as output a signal if the information results from an evaluation result, according to which at least one seat of the seating arrangement is occupied and/or a selected predefined seat occupancy state is present.

In some embodiments the method additionally comprises detecting a seatbelt fastening state of at least one seat in the seating arrangement or receiving seatbelt information identifying this seatbelt fastening state, wherein the signal source is activated as a function of the seatbelt information and the information from the evaluation result in such a way as to output a seatbelt fastening warning signal if, according to the information, at least one seat of the seating arrangement is occupied and/or a selected predefined seat occupancy state is present and the seatbelt information indicates that the associated seatbelt is not fastened. In this way, radar-based seatbelt checking and warning systems can be achieved, in particular with regard to the detection only.

In some embodiments, the individual radar points of each radar point cloud are further represented in each case by a signal-to-noise ratio of the radar signal at the respective radar point. In this case, the Doppler-shift value and/or the signal-to-noise ratio can be used for pre-filtering the radar point cloud as part of a pre-processing stage prior to the feature extraction.

In some embodiments, the determination of the seat occupancy state of the seating arrangement on the basis of the evaluation model is carried out exclusively, or at least predominantly in a numerical sense, on the basis of those radar points for which the Doppler-shift value is at or above a predefined non-zero displacement threshold. Thus, only or at least predominantly so-called dynamic radar points are used as the basis for the evaluation, i.e. such radar points as indicate a movement of the scanned object, the Doppler-shift value of which is at or above the shift threshold. This can be used in particular to further increase the quality, in particular the reliability of the method, because static, i.e. essentially stationary points on the object surfaces, such as points on a seat surface of a seat, are not included in the evaluation, or only in smaller numbers than points that display dynamics and are therefore highly likely to be assigned to a living being, in particular a person or an animal. This allows the output information obtained from the evaluation (e.g. for airbag control or a seatbelt warning system) to be utilized, in particular, according to whether a living being or a static object surface has been detected.

A second aspect of the present solution relates to a system, in particular a data processing device, for the automated detection of an, in particular any, seat occupancy state of a seating arrangement having at least one seat, in particular with at least one vehicle seat in or for a vehicle. In this case, the system comprises a data processing device which is configured, in particular by means of a corresponding computer program, to carry out the method according to the first aspect to detect the seat occupancy state.

A third aspect of the present solution relates to a computer program or computer program product, comprising instructions which, when executed on the data processing device of the system according to the second aspect, cause the system to execute the method according to the first aspect.

The computer program can, in particular, be stored in a non-volatile data carrier. This is preferably a data carrier in the form of an optical data carrier or a flash memory module. This may be advantageous if the computer program as such is to be handled independently of a processor platform on which the one or more programs are to be run. In another implementation, the computer program can be present as a file on a data processing unit, in particular on a server, and can be downloaded via a data link, for example the Internet or a dedicated data link such as a proprietary or local network. In addition, the computer program can have a multiplicity of individual interacting program modules. In particular, the modules can be configured to be used, or in any case can be used, in such a way that they can be used in the sense of distributed computing on different devices (computers or processor units) that are geographically remote and connected to each other via a data network.

The system according to the second aspect can correspondingly have a program memory in which the computer program is stored. Alternatively, the system can also be configured to access, via a communication link, a computer program which is available externally, for example on one or more servers or other data processing units, in particular in order to exchange therewith data which is used while the method or computer program is running, or constitutes outputs of the computer program.

A fourth aspect of the present solution relates to a vehicle comprising a seating arrangement having at least one seat, a radar sensor for radar scanning at least sections of the seating arrangement, and a system according to the second aspect for the automated detection of an, in particular respective, seat occupancy state of the seating arrangement as a function of a radar scan of at least sections of the seating arrangement carried out by the radar sensor.

The features and advantages which are explained with respect to the first aspect of the present solution apply correspondingly also to the further aspects of the invention.

Further advantages, features and application possibilities of the present solution can be found in the following detailed description in conjunction with the figures.

In the figures, identical reference signs designate identical, similar or mutually corresponding elements. Elements in the figures shown are not necessarily shown to scale. Rather, the different elements shown in the figures are reproduced in such a way that their function and general purpose are understandable to the person skilled in the art. Connections and couplings between functional units and elements shown in the figures can, unless explicitly stated otherwise, also be implemented as an indirect connection or coupling. Functional units can be implemented in particular as hardware, software, or a combination of hardware and software.

Figure 1:
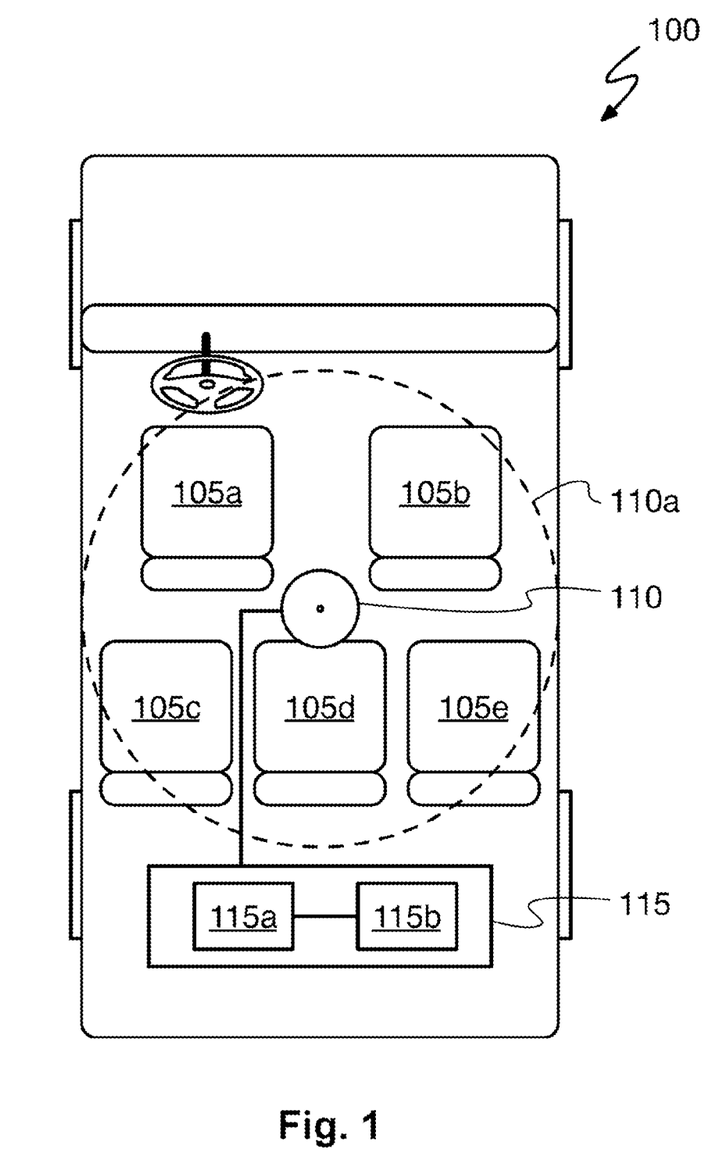
FIG. 1 shows schematically an exemplary embodiment of a vehicle, which is equipped with a system for the automated detection of a seat occupancy state of a seating arrangement in the vehicle.

The exemplary embodiment of a vehicle 100 schematically illustrated in FIG. 1 has a seating arrangement 105 with five individual seats or seating positions 105a to 105e. Each of the seats 105a to 105e is suitable for accommodating one person as a passenger of the vehicle 100. The vehicle 100 further comprises a radar sensor 110, which is mounted inside the vehicle cabin on its ceiling and configured so that it can scan the seating arrangement 105, at least substantially, by means of radar beams. Accordingly, the seats 105a to 105e, in particular their seat surfaces, are located at least in each case predominantly within an observation field 110a that can be scanned by the radar sensor 110. In addition, the vehicle 100 comprises a system 115 for the automated detection of a seat occupancy state of the seating arrangement 105 as a function of a radar scan of at least sections of the seating arrangement 105 with respect to the observation field 110a, carried out by the radar sensor 110.

The system 115 comprises in particular a data processing unit 115a with at least one microprocessor and a memory 115b signal-connected to it, in which a computer program is stored, which is configured for carrying out the method described in the following with reference to FIG. 6, for the automated detection of a seat occupancy state of the seating arrangement 105. Furthermore, the sensor data generated by the radar sensor 110 during the radar scan or information already obtained from this by further processing, can be or is stored in the memory 115b.

In the following, reference is now made to FIG. 2, which illustrates a radar point cloud, wherein in the interests of clarity of representation the inherently three-dimensional radar point cloud has been reduced to two dimensions by projection of the positions of the radar points of the radar point cloud on a plane spanned by two of its dimensions.

Figure 2:
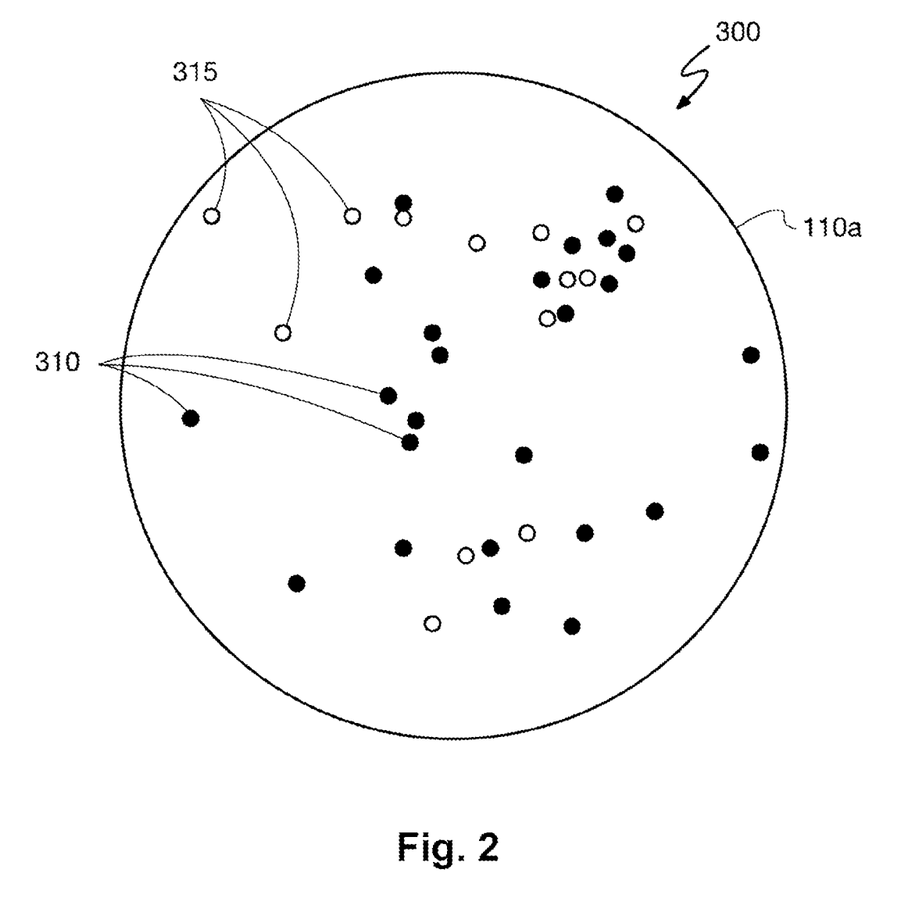
FIG. 2 shows an exemplary two-dimensional representation of a (single) radar point cloud corresponding to a single measurement frame captured by a radar sensor of the vehicle from FIG. 1.

FIG. 2 illustrates an exemplary single radar point cloud 300 as acquired within a single measurement frame, i.e. as a result of a radar scan of the seating arrangement 105 by the radar sensor 110 during a defined time interval (measurement period). The position of the individual radar points within the radar point cloud 300 can be represented by spatial coordinates, for example, Cartesian coordinates X and Y can be assigned to the plane of the drawing and thus to each individual point. In reality, if the dimension reduction is due to the drawing is disregarded, a third coordinate Z should be added for the third spatial dimension If not only the spatial positions of the locations where the radar beam is reflected from the scanned objects are acquired as coordinates during the radar scanning, but a Doppler shift is measured as well, then the individual radar points can be classified according to the magnitude of this Doppler shift, in particular into two different classes.

The latter can be achieved, for example, by comparing the Doppler shift with a predefined shift threshold that corresponds to a certain shift velocity. Depending on the result of the comparison, those radar points 310, which according to the value of their associated Doppler shift have no velocity or a velocity of the object surface at the reflection point that is below the shift threshold, can be classified as "static" radar points (shown in FIG. 2 in each case with a filled black circle). Conversely, those radar points 315 which have a Doppler shift above the shift threshold can be classified as "dynamic" radar points 315 (shown in FIG. 2 with a black ring in each case).

The classification of the radar points 310 and 315 according to their Doppler shift is not mandatory, but it can be used, however, to process the radar point cloud 300, in particular in the context of a pre-processing carried out before its evaluation, in particular to filter it depending on the classification. For example, this filtering could be carried out in such a way that only dynamic radar points 315 are taken into account for the evaluation, for example, in order to detect only moving objects.

Figure 3A:
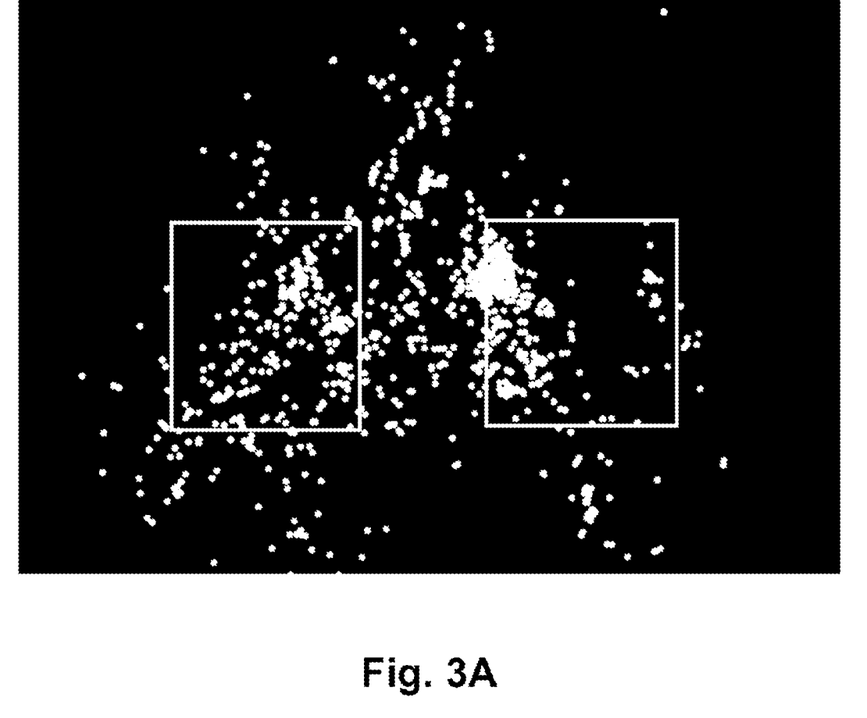
FIG. 3A shows a portion of a radar point cloud acquired according to the radar point cloud shown in FIG. 2, which is obtained by a radar scan of the front seats shown in FIG. 1 when a person who is not moving quickly or only slightly is located on each seat.
Figure 3B:
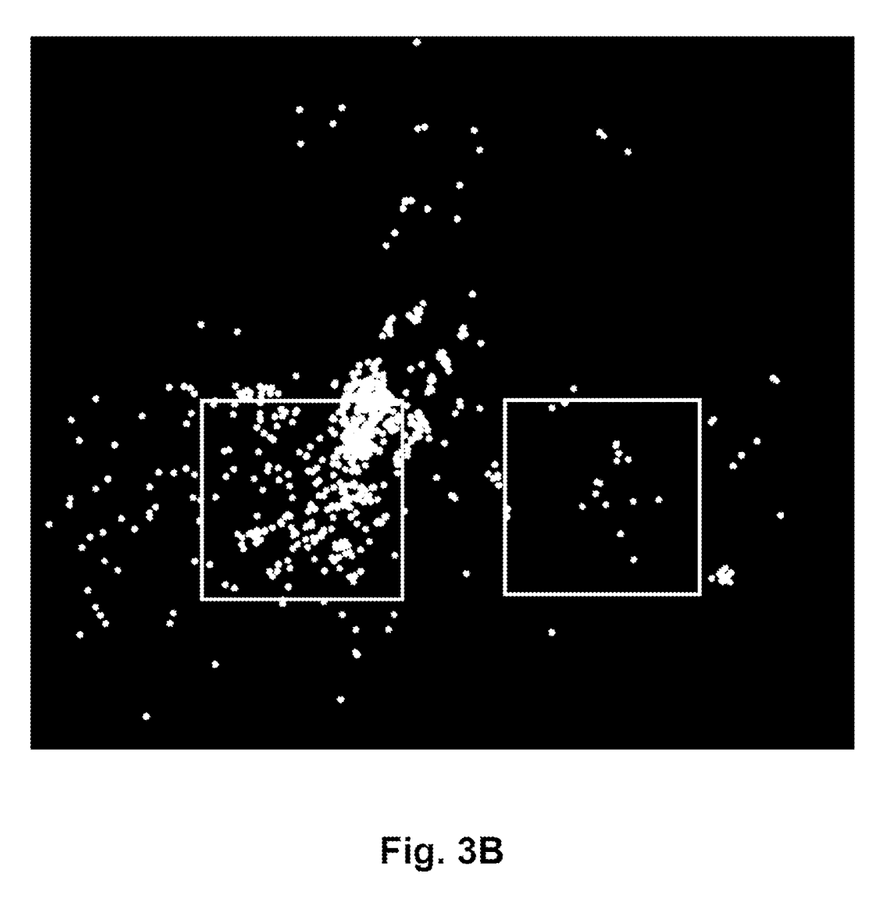
FIG. 3B shows a portion of a radar point cloud acquired according to the radar point cloud shown in FIG. 2, which is obtained by a radar scan of the front seats shown in FIG. 1 when a person is sitting on both of the seats and the person sitting in the left-hand seat is moving quickly while the person in the right-hand seat is essentially sitting still.

FIG. 3A shows a portion of a radar point cloud acquired according to the radar point cloud 300 shown in FIG. 2, which is obtained by a radar scan of the seats 105a, 105b shown in FIG. 1 when there is one person on each of the seats 105a, 105b who is not moving quickly or only slightly, and FIG. 3B shows a portion of a radar point cloud 305 acquired according to the radar point cloud shown in FIG. 2, which is obtained by a radar scan of the seats 105a, 105b shown in FIG. 1 when there is one person on each of the seats 105a, 105b and the person on the left seat 105a is moving quickly while the person on the right-hand seat 105b is essentially sitting still.

In addition, in FIGS. 3A and 3B, cuboid (3D case) or in the present 2D representation rectangular, selected spatial regions are drawn (each represented by two white rectangles in FIGS. 3A and 3B), which are spatially assigned to the respective position of the individual seats 105a, 105b. The definition of these spatial regions can now be used to cluster the radar point cloud 300, wherein each radar point (the white points in FIGS. 3A and 3B) is assigned, as far as possible, to the spatial region in which it is located. Any radar points not located in one of the spatial regions may be subsequently disregarded.

As shown in FIG. 3A, in the event that persons 105a, 105b are essentially sitting still on both seats, the numbers of 3 radar points in the spatial region located on the left in FIG. 3A and assigned to the left-hand seat 105a, and in the spatial region located on the right in FIG. 3A and assigned to the right-hand seat 105b, are approximately equal and significantly different from zero, so that using the method described below for the automated detection of a seat occupancy state of a seating arrangement, it can be determined that both seats 105a, 105 are occupied.

In contrast, as shown in FIG. 3B, in the case in which there are persons on both seats 105a, 105b, wherein the person on the left seat 105a is moving to a large extent while the person on the right seat 105b is essentially sitting still, the number of radar points in the spatial region located on the left in FIG. 3A and assigned to the left-hand seat 105a is significantly higher than the number of radar points in the spatial region located on the right-hand side of FIG. 3B and assigned to the right-hand seat 105b, and also significantly higher than in the case shown in FIG. 3A. In this case, the number of radar points in the spatial region located on the right and assigned to the right-hand seat 105b in FIG. 3B is also very small, so that it is not possible to determine, or not reliably, that the right seat 105b is occupied by means of the method described below for the automated detection of a seat occupancy state of a seating arrangement.

Figure 4:
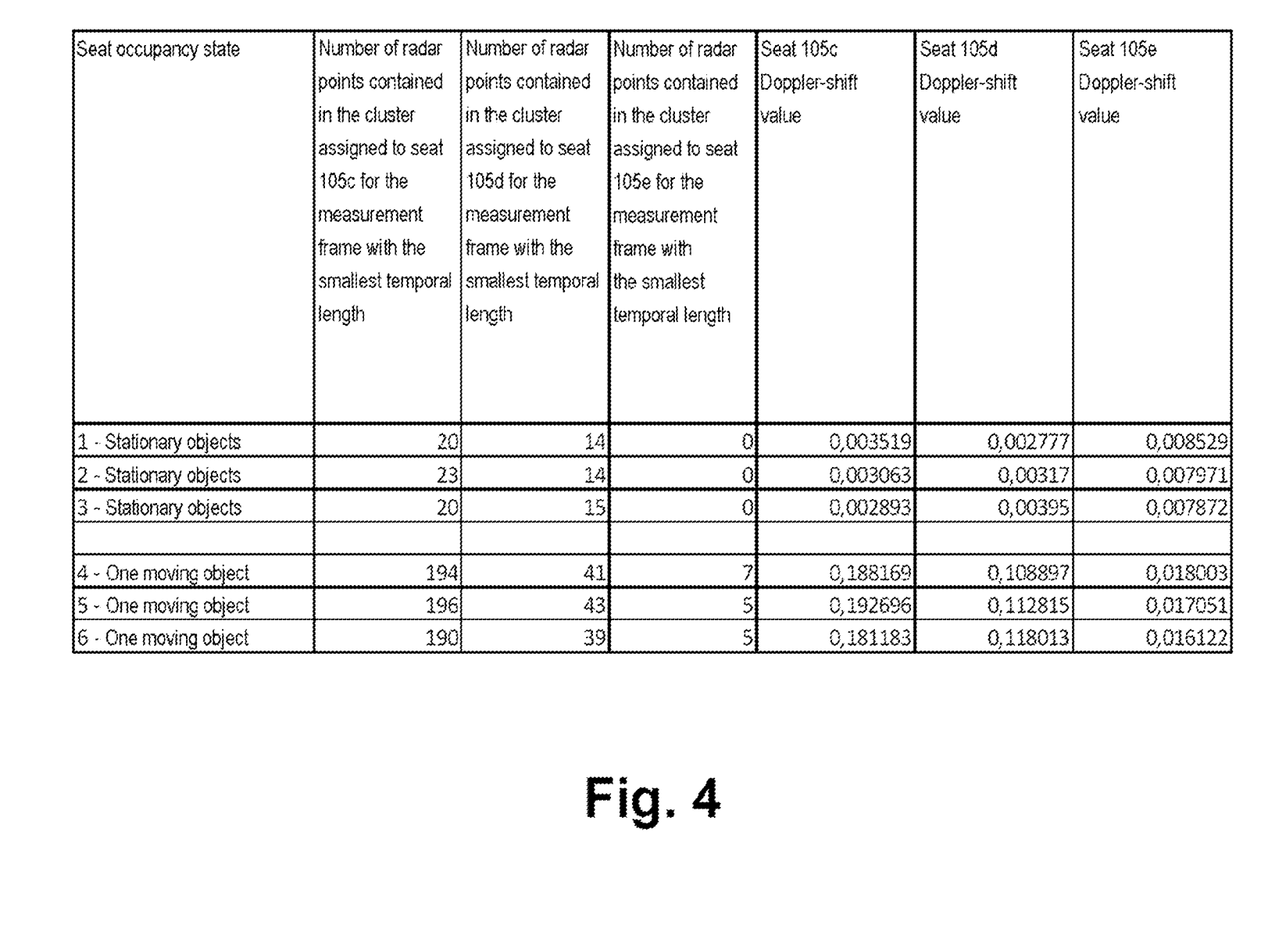
FIG. 4 shows a table in which, for different seat occupancy states of three seats, the number of radar points contained in the cluster assigned to the respective seat for the measurement frame with the smallest temporal length and the Doppler shift value of radar points contained in the cluster assigned to the respective seat are specified for the seats.

FIG. 4 shows a table which indicates, for different seat occupancy states of the three rear seats 105c, 105d, 105e shown in FIG. 1, the number of radar points contained in the cluster associated with the respective seat for the measurement frame with the smallest temporal length and the Doppler-shift value of radar points contained in the cluster associated with the respective seat for the seats 105c, 105d, 105e.

In this case, in the seat occupancy states 1 to 3, one person is seated on each of the seats 105c and 105d who is either not moving or only moving slightly, while in the seat occupancy states 4 to 6, a person is seated on seat 105c who is moving significantly or quickly, and on seat 105d a person is sitting still or is not moving or moving only slightly, wherein in all seat occupancy states 1 to 6 the seat 105e is free or unoccupied.

As can be seen from the table, for stationary objects (seat occupancy states 1 to 3) all values are fairly low, wherein the number of radar points contained in the cluster associated with the respective seat for the measurement frame with the smallest temporal length is similar for the two seats 105c, 105d and is in the range 10 to 30, and the Doppler-shift values for the two seats 105c, 105d are also similar and are in a range below 0.01.

However, if a person is moving quickly and considerably, as in the seat occupancy states 4 to 6, all these values increase sharply. For example, the number of radar points contained in the cluster assigned to seat 105c for the measurement frame with the smallest temporal length is up to 10 times higher than in the seat occupancy states 1 to 3 and assumes values close to 200. The Doppler-shift value is up to 20 times higher than in the seat occupancy states 1 to 3 and assumes values of almost 0.2.

In addition, there are significant differences apparent between the values relating to seat 105c and seat 105d, namely that the number of radar points contained in the cluster assigned to the seat 105c for the measurement frame with the smallest temporal length is about 4 to 5 times higher than the number of radar points contained in the cluster assigned to the seat 105d for the measurement frame with the smallest temporal length, and that the Doppler-shift value for seat 105c is approximately 1.5 to 2 times higher than the Doppler-shift value for seat 105d.

These observations are used in the method according to the invention described below to check certain seat occupancy states for correctness by means of the evaluation model, and if it is determined that a specific seat occupancy condition is incorrect, to reject the corresponding result.

Figure 5:
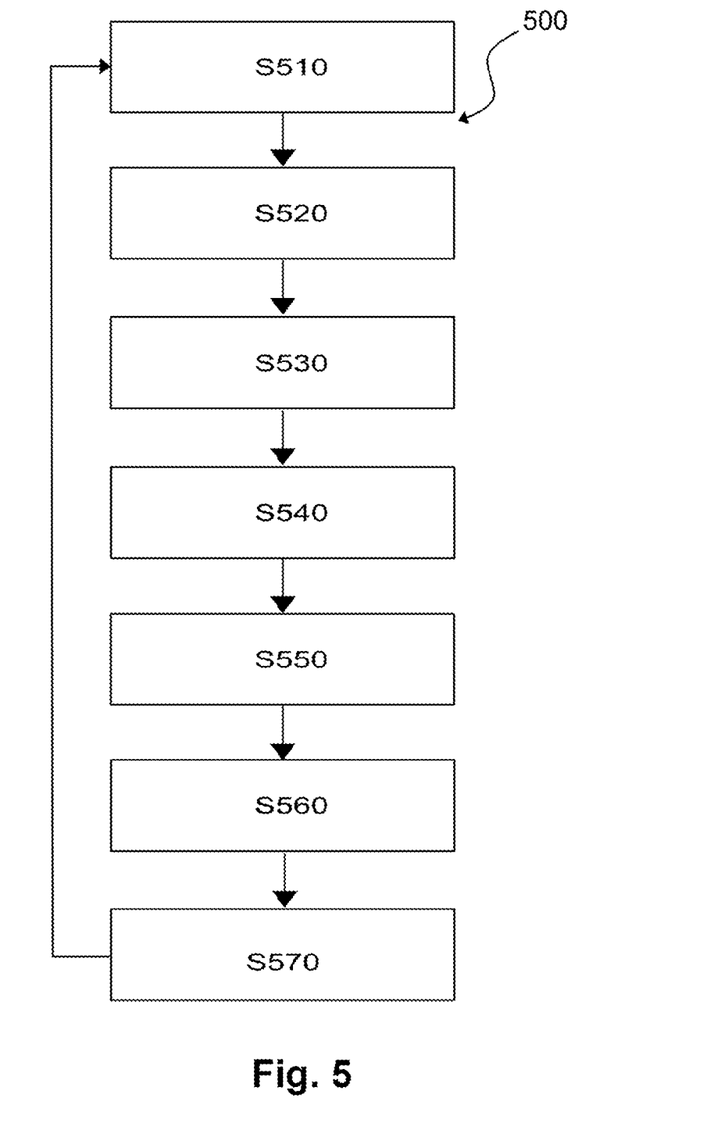
FIG. 5 shows a flow diagram illustrating an exemplary embodiment of a method for automatically detecting a seat occupancy state of a seating arrangement.

FIG. 5 shows a flow diagram illustrating an exemplary embodiment of a method 500 for the automated detection of a seating occupancy state of a seating arrangement. The method can in particular be embodied as a computer-implemented method. For this purpose, it can be stored in particular in the memory 115b of the system 115 as a computer program and be executable on the data processing unit 115a.

In the method 500, radar measurement data, in the present example from the radar sensor 110 of the vehicle 100, are received and further processed to form one or more radar point clouds. For this purpose, in a step S510, the radar measurement data, which represents one assigned radar point cloud 300 for each measurement frame from multiple measurement frames, is first received so that the measurement data represents a multiplicity of radar point clouds corresponding to the multiple measurement frames, wherein each radar point cloud 300 of the multiplicity of radar point clouds was or is obtained on the basis of a radar scan of a spatial region surrounding at least some sections of the seating arrangement 105, which takes place at a measurement time or during a measurement period assigned to the respective measurement frame, and contains radar points 310, 315.

In this case, the multiple measurement frames comprise multiple groups of measurement frames, each containing one or preferably more measurement frames of equal temporal length, wherein the temporal length of measurement frames of different groups of measurement frames is different, and one corresponding group of radar point clouds is assigned to each of the multiple groups of measurement frames. Furthermore, preferably at least one measurement frame of one of the at least two groups of measurement frames and one measurement frame of another of the at least two groups of measurement frames overlap in time.

Then, in a step S520, using an evaluation model which, as a function of at least two groups of radar point clouds, each preferably comprising a plurality of temporally consecutive measurement frames, returns one of a plurality of predefined possible seat occupancy states of the seating arrangement 105 as an evaluation result, a seat occupancy state of the seating arrangement 105 is determined, wherein the individual radar points 310, 315 of each radar point cloud 300 are represented in each case by at least one position of the respective radar point in the three-dimensional space.

For this purpose, for each radar point cloud 300, the set of its radar points 310, 315 is sub-divided by means of clustering, as a function of the respective spatial position of the radar points 310, 315 in relation to the seats 105a to 105e, into a plurality of clusters each containing a subset of the radar points 310, 315 in order to individually assign to each of the seats 105a-e one of the clusters located spatially closest to it. Optionally, filtering can be carried out to ensure that static radar points, i.e. radar points that have a Doppler-shift value lower than a predefined Doppler-shift threshold, are filtered out.

In the clustering of the radar point cloud 300, it can be checked in particular for each of its radar points whether the point lies within one of the defined spatial regions and, if so, in which one. Thus, each of the radar points can be assigned either to one of the spatial regions or to the other observation field. All radar points located within the same spatial region are grouped together to form a cluster. As a result, each of the seats 105a to 105e is assigned a corresponding cluster of the radar point cloud 300. This forms the basis for the fact that for each seat 105a to 105e, an individual evaluation can subsequently be made as to whether or not the respective seat 105a to 105e is or was occupied.

In order to facilitate the subsequent evaluation of the clustered radar point clouds 300, for each of the respective radar point clouds of the at least two groups of radar point clouds which are taken into account in the context of determining the seat occupancy state, a value of at least one defined characteristic value for identifying radar point clouds can be determined, wherein in particular a corresponding characteristic value K(i) can be determined for each of the clusters, and this characteristic value K(i) can be defined in particular as the number of radar points in the cluster. If no Doppler-shift value filtering has taken place, this can be a common count of both the static and the dynamic radar points 310 and 315, respectively. However, if the static radar points 310 were previously filtered out, for example, as mentioned above, it only involves a count of the dynamic radar points 315.

In this case, the evaluation model is or will be defined in such a way that, when determining the seat occupancy state of the seating arrangement 105, the evaluation result is determined as a function of the respective values of the at least one characteristic value for the radar point clouds of the at least two groups of radar point clouds that are taken into account in determining the seat occupancy state.

In the process, for at least one of the characteristic values of a plurality of radar point clouds of each group of the at least two groups of radar point clouds, the respective values of the characteristic value are analysed in such a way that a periodic curve of the characteristic value is detected, wherein the evaluation result is determined as a function of the result of the analysis.

The evaluation model preferably comprises a trained machine learning model such as an artificial neural network or a decision tree-based model, wherein data which represents the at least the two groups of radar point clouds or values of one or more characteristic values defined for them, is provided as input data to the machine learning model in order to obtain the evaluation result as its output.

The determination of the seat occupancy state of the seating arrangement 105 comprises an individual determination of a respective individual seat occupancy state for each of the seats 105a to 105e as a function of the respective associated clusters of the at least two groups of radar point clouds, in order to obtain an evaluation result identifying a seat occupancy state of the respective seat 105a to 105e.

In a step S530, for each cluster of at least one radar point cloud of the particular group of the at least two groups of radar point clouds that is assigned to the measurement frame with the smallest temporal length, a number of the radar points contained in the respective cluster, or a quantity dependent on that number, is determined and it is thus determined whether or not the number of radar points contained in the respective cluster of a single radar point cloud of the particular group of the at least two groups of radar point clouds that is assigned to the measurement frame with the smallest temporal length, or a quantity dependent on that number, or whether or not a mean value of the respective numbers of the radar points contained in respective clusters of multiple radar point clouds, spatially corresponding to each other, of the particular group of the at least two groups of radar point clouds that is assigned to the measurement frame with the smallest temporal length, or a quantity dependent on that number, is less than a first predefined threshold value.

In a step S540, a seat occupancy state stored in the memory 105b and determined based on an earlier radar scan is updated based on the evaluation result only if, for each cluster of the individual radar point cloud of the particular group of the at least two groups of radar point clouds that is assigned to the measurement frame with the smallest temporal length, the number of the radar points or the quantity dependent on it is less than the first predefined threshold value, or if all the mean values of the respective numbers of the radar points in respective clusters of multiple radar point clouds, spatially corresponding to each other, of the particular group of the at least two groups of radar point clouds that is assigned to the measurement frame with the smallest temporal length, or the quantity dependent on that number, is less than the first predefined threshold.

In a step S550, information defined as a function of the evaluation result is then output, for example on a user interface of the vehicle or in the form of data for further processing by one or more other systems, in particular systems of the vehicle, if the stored seat occupancy state has been updated, wherein the information output may be the seat occupancy state for the seating arrangement 105 determined in step S520 based on the evaluation model.

In this example, this information will be used in particular to check whether or not a belt warning signal should be issued, depending on the seat occupancy state of a particular seat 105a to 105e and the result of a test to determine whether or not a corresponding seatbelt for that seat has been fastened.

To do this, in a step S560 it can be checked whether the seatbelt for the seat concerned is fastened (for example, for seat 105b) and in a step S570 a functionality of the vehicle 100 is controlled depending on the information output in step S550 on the seat occupancy state and the status of the seatbelt determined in step S560. In particular, this can be carried out in such a way that in step S570 a signal source for outputting an in particular optical and/or acoustic seatbelt status signal is activated in order to signal one or more other occupants of the vehicle, if necessary, that a seat is occupied but the seatbelt there is not fastened. The method then branches back to step 510 to start another loop pass.

Accordingly, in one embodiment in which the individual radar points 310, 315 of each radar point cloud 300 are further represented in each case by a Doppler-shift value of the radar signal at the respective radar point, wherein in step 530 it is preferably determined for each cluster of at least one radar point cloud of the at least two groups of radar point clouds whether or not the Doppler-shift value of each radar point of the respective cluster or a mean value of the Doppler-shift values of all radar points of the respective cluster is less than a second predefined threshold value, and in step 540 the stored seat occupancy state is updated based on the evaluation result only if, for each cluster of a single radar point cloud of the at least two groups of radar point clouds, the Doppler-shift value of each radar point of the respective cluster or a mean value of the Doppler-shift values of all radar points of the respective cluster is less than the second predefined threshold value, or if a mean value of the respective mean values of the Doppler-shift values of all radar points contained in respective clusters of multiple radar point clouds, spatially corresponding to each other, of the at least two groups of radar point clouds is less than the predefined second threshold value.

While at least one exemplary embodiment has been described above, it has to be noted that there are a large number of variations in this respect. It is also to be noted here that the described exemplary embodiments constitute only non-limiting examples and they are not intended to limit the scope, applicability or configuration of the devices and methods described here. Instead, the above description will provide a person skilled in the art with an indication for the implementation of at least one exemplary embodiment, wherein it is understood that various changes in the means of functioning and the arrangement of the elements described in an exemplary embodiment can be made without departing here from the subject matter which is respectively defined in the appended claims or its legal equivalents.

LIST OF REFERENCE SIGNS 100 vehicle
105 seating arrangement
105a-e seats or seating positions
110 radar sensor
110a observation field of the radar sensor 110
115 system for automatically detecting a seat occupancy state
115a data processing unit
115b memory
300 (single) radar point cloud
310 static radar points
315 dynamic radar points
500 method for automatically detecting a seat occupancy state
S510-S570 individual processes or method steps within the context of the method 500

The invention claimed is:

1. A method for automatically detecting a seat occupancy state of a seating arrangement having a plurality of seats for which a seat occupancy state is to be determined individually or cumulatively as part of the method, the method comprising:
receiving or generating measurement data, in each case representing an associated radar point cloud for each measurement frame from a plurality of measurement frames, so that the measurement data represents a multiplicity of radar point clouds corresponding to the plurality of measurement frames,
wherein each radar point cloud of the multiplicity of radar point clouds is obtained on the basis of a radar scan of a spatial region surrounding at least some sections of the seating arrangement, which takes place at a measurement time or during a measurement period assigned to the respective measurement frame, and contains radar points,
wherein the plurality of measurement frames comprise a plurality of groups of measurement frames which each comprise one or more measurement frames of the same temporal length, the temporal length of measurement frames of different groups of measurement frames is different, and one corresponding group of radar point clouds is assigned to each of the plurality of groups of measurement frames;
determining a seat occupancy state of the seating arrangement based on an evaluation model, which returns, as a function of at least two groups of radar point clouds, one of a plurality of predefined possible seat occupancy states of the seating arrangement as an evaluation result,
wherein the individual radar points of each radar point cloud are each represented at least by one position of the respective radar point in three-dimensional space;
for each radar point cloud, the set of its radar points is sub-divided by clustering, as a function of the respective spatial position of the radar points in relation to the seats, into a plurality of clusters each containing a subset of the radar points to individually assign to each of the seats one of the clusters located spatially closest to it,
wherein the determination of the seat occupancy state of the seating arrangement comprises an individual determination of a respective individual seat occupancy state for each of the seats as a function of the respective associated clusters of the at least two groups of radar point clouds, to obtain an evaluation result identifying a seat occupancy state of the respective seat;
determining, for each cluster of at least one radar point cloud of that group of the at least two groups of radar point clouds that is assigned to the measurement frame with the smallest temporal length, a number of the radar points contained in the respective cluster, or a quantity dependent on it;
determining whether or not the number of radar points contained in the respective cluster of a single radar point cloud of the particular group of the at least two groups of radar point clouds that is assigned to the measurement frame with the smallest temporal length, or a quantity dependent on that number, or whether or not a mean value of the respective numbers of the radar points contained in respective clusters of multiple radar point clouds, spatially corresponding to each other, of the particular group of the at least two groups of radar point clouds that is assigned to the measurement frame with the smallest temporal length, or a quantity dependent on that number, is less than a first predefined threshold value;

updating a stored seat occupancy state based on the evaluation result only if, for each cluster of the individual radar point cloud of the particular group of the at least two groups of radar point clouds that is assigned to the measurement frame with the smallest temporal length, the number of radar points or the quantity dependent on it is less than the first predefined threshold value, or if all the mean values of the respective numbers of the radar points in respective clusters of multiple radar point clouds, spatially corresponding to each other, of the particular group of the at least two groups of radar point clouds that is assigned to the measurement frame with the smallest temporal length, or the quantity dependent on that value, is less than the first predefined threshold; and outputting information defined according to the evaluation result if the stored seat occupancy state has been updated.

2. The method according to claim 1, wherein:

the individual radar points of each radar point cloud are further represented in each case by a Doppler-shift value of the radar signal at the respective radar point, and for each cluster of at least one radar point cloud of the at least two groups of radar point clouds it is determined whether or not the Doppler-shift value of each radar point of the respective cluster or a mean value of the Doppler-shift values of all radar points of the respective cluster is less than a second predefined threshold value, and the stored seat occupancy state is only updated based on the evaluation result if, for each cluster of a single radar point cloud of the at least two groups of radar point clouds, the Doppler-shift value of each radar point of the respective cluster or a mean value of the Doppler-shift values of all radar points of the respective cluster is less than the second predefined threshold value, or if a mean value of the respective mean values of the Doppler-shift values of all radar points contained in respective clusters of multiple radar point clouds, spatially corresponding to each other, of the at least two groups of radar point clouds is less than the predefined second threshold value.

3. The method according to claim 1, wherein the at least two groups of measurement frames have a plurality of temporally consecutive measurement frames.

4. The method according to claim 1, further comprising:

for each of the relevant radar point clouds of the at least two groups of radar point clouds taken into account in determining the seat occupancy state, determining the respective value of at least one defined characteristic value for characterizing radar point clouds, wherein the evaluation model is or will be defined in such a way that, when determining the seat occupancy state of the seating arrangement, the evaluation result is determined as a function of the respective values of the at least one characteristic value for the radar point clouds of the at least two groups of radar point clouds that are taken into account in determining the seat occupancy state.

5. The method according to claim 4, wherein for at least one of the characteristic values of a plurality of radar point clouds of each group of the at least two groups of radar point clouds, the respective values of the characteristic value are analysed in such a way that a periodic curve of the characteristic value is detected; and the evaluation result is determined as a function of the result of the analysis.

6. The method according to claim 4, wherein the or one of the characteristic values is or will be defined by the number of radar points in the respective radar point cloud or a quantity dependent on that number.

7. The method according to claim 1, wherein at least one measurement frame of one of the at least two groups of measurement frames and one measurement frame of another of the at least two groups of measurement frames overlap in time.

8. The method according to claim 1, wherein the evaluation model comprises a trained machine learning model; and data which represents the at least the two groups of radar point clouds or values of one or more characteristic values defined for them, is provided as input data to the machine learning model in order to obtain the evaluation result as its output.

9. The method according to claim 1, wherein the output of the information comprises activating a signal source as a function of the information to cause the signal source to output a defined signal depending on the activation.

10. The method according to claim 9, wherein the signal source is activated as a function of the information so as output a signal if the information results from an evaluation result, according to which at least one seat of the seating arrangement is occupied and/or a selected predefined seat occupancy state is present.

11. The method according to claim 10, further comprising:

detecting a seatbelt fastening state of at least one seat in the seating arrangement or receiving seatbelt information characteristic of this seatbelt fastening state;

wherein the signal source is activated as a function of the seatbelt information and the information from the evaluation result, in such a way as to output a seatbelt fastening warning signal if, according to the information, at least one seat of the seating arrangement is occupied and/or a selected predefined seat occupancy state is present and indicates seatbelt information that the associated seatbelt is not fastened.

12. The method according to claim 1, wherein the individual radar points of each radar point cloud are further represented in each case by a signal-to-noise ratio of the radar signal at the respective radar point.

13. The method according to claim 2, wherein the determination of the seat occupancy state of the seating arrangement on the basis of the evaluation model is carried out exclusively on the basis of the evaluation model, or at least predominantly in a numerical sense, on the basis of such radar points, the Doppler-shift value of which is at or above a predefined non-zero displacement threshold.

14. A system for automatically detecting a seat occupancy state of a seating arrangement having at least one seat, wherein the system comprises a data processing device which is configured to carry out the method according to claim 1 for detecting the seat occupancy state.

15. A vehicle, comprising:

a seating arrangement with at least one seat;

a radar sensor for radar scanning at least sections of the seating arrangement; and a system according to claim 14 for the automated detection of a seat occupancy state of the seating arrangement as a function of a radar scan of at least sections of the seating arrangement carried out by the radar sensor.

* * * * *